United States Patent [19]
Meyer et al.

[11] 3,720,947
[45] March 13, 1973

[54] POLARIZATION DEVICE FOR RADAR ANTENNA

[75] Inventors: William J. Meyer, Glen Burnie; John H. Staehlin, Baltimore, both of Md.

[73] Assignee: The United States of America as represented by the Secretary of the Navy

[22] Filed: Dec. 30, 1963

[21] Appl. No.: 334,665

[52] U.S. Cl..................................343/756, 333/21 A
[51] Int. Cl................................................H01q 15/24
[58] Field of Search......................343/756; 333/21 A

[56] References Cited

UNITED STATES PATENTS 2,995,717  8/1961  Schoennauer, Jr.............333/21 A X
3,024,463  3/1962  Moeller et al...................333/21 A X

*Primary Examiner*—Benjamin A. Borchelt
*Assistant Examiner*—Richard E. Berger
*Attorney*—R. S. Sciascia and Paul S. Collingnon

[57] ABSTRACT

Apparatus for selectively changing the operation of radar antennas to work in either a linear polarization mode, a left-hand circular polarization mode, or a right-hand circular polarization mode.

4 Claims, 9 Drawing Figures

PATENTED MAR 13 1973
3,720,947
SHEET 1 OF 3
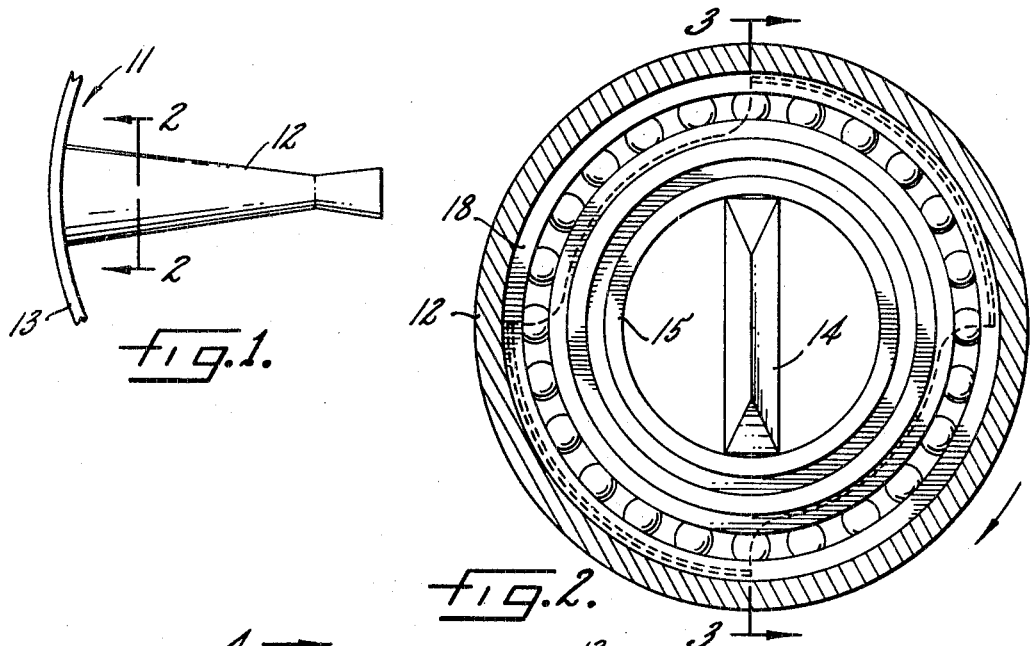
fig.1.
fig.2.
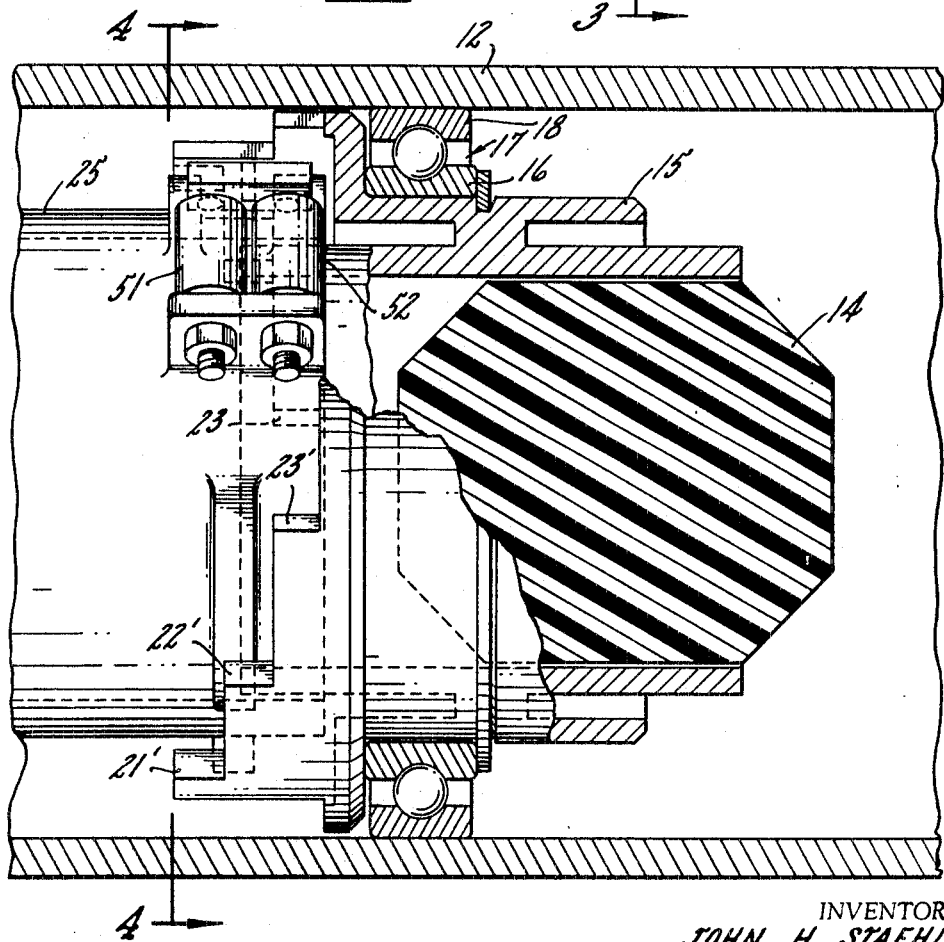
fig.3.
INVENTORS.
JOHN H. STAEHLIN
WILLIAM J. MEYER
BY
H. H. Loscke
Paul S. Collignon
ATT'YS.

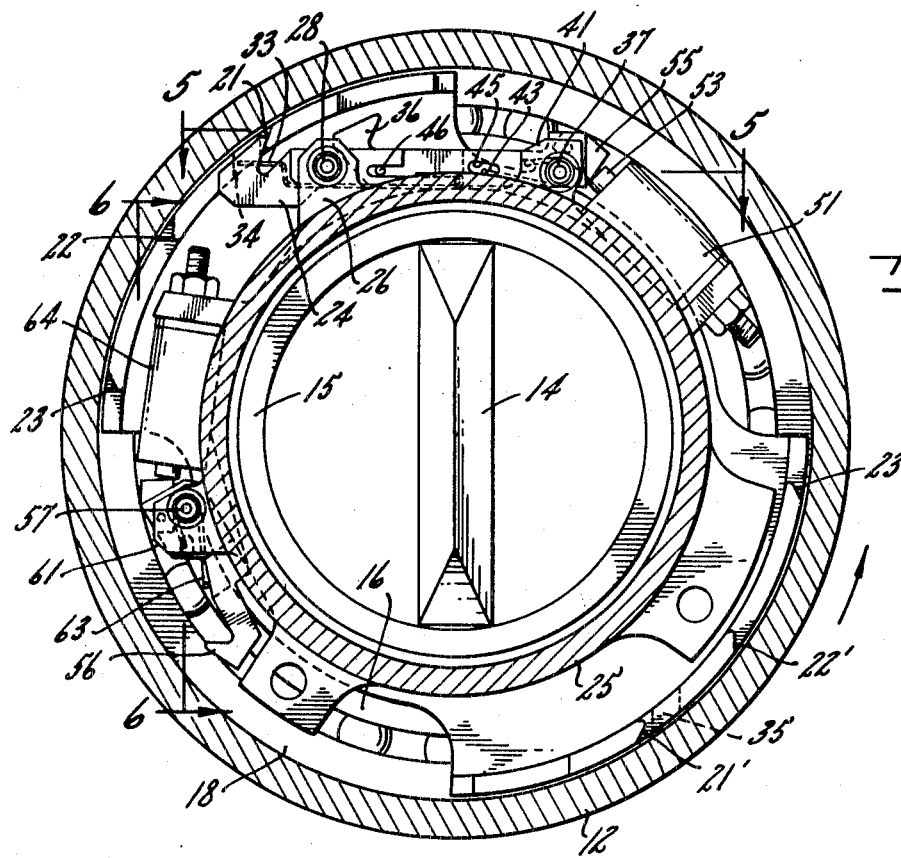
fig.4.
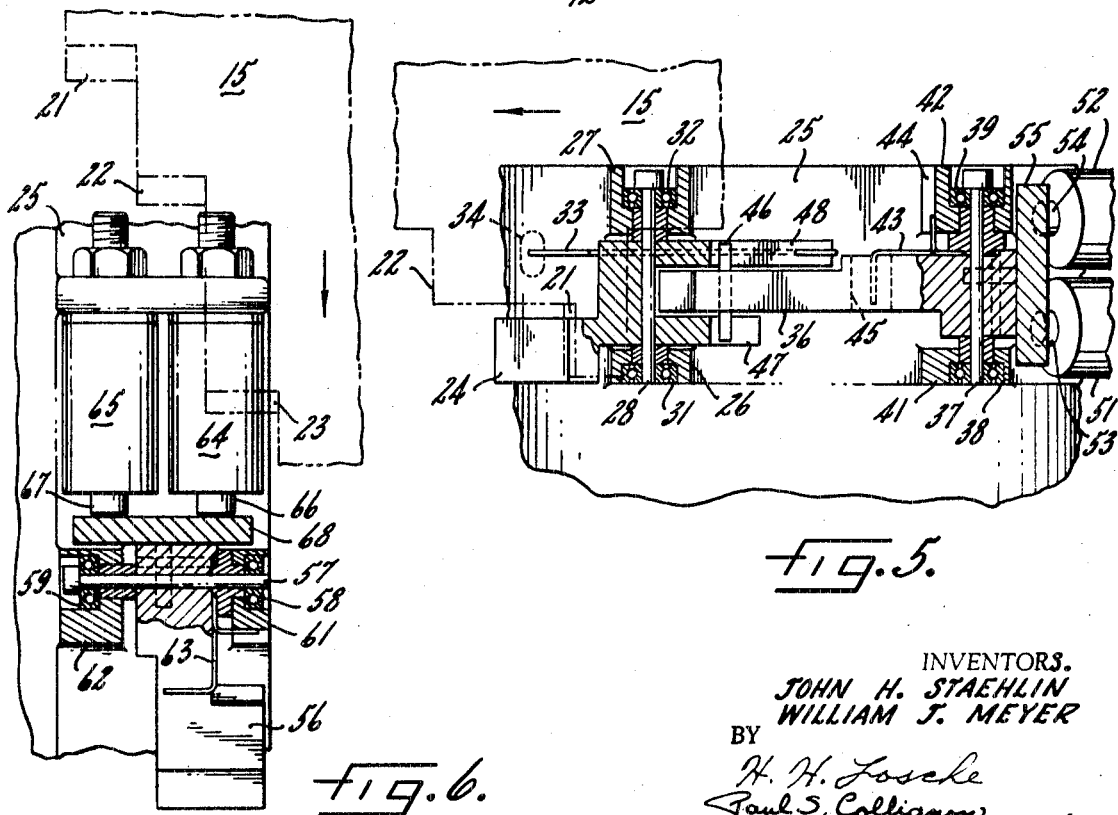
fig.5.
fig.6.
INVENTORS.
JOHN H. STAEHLIN
WILLIAM J. MEYER
BY
H. H. Losche
Paul S. Collignon ATT'YS.

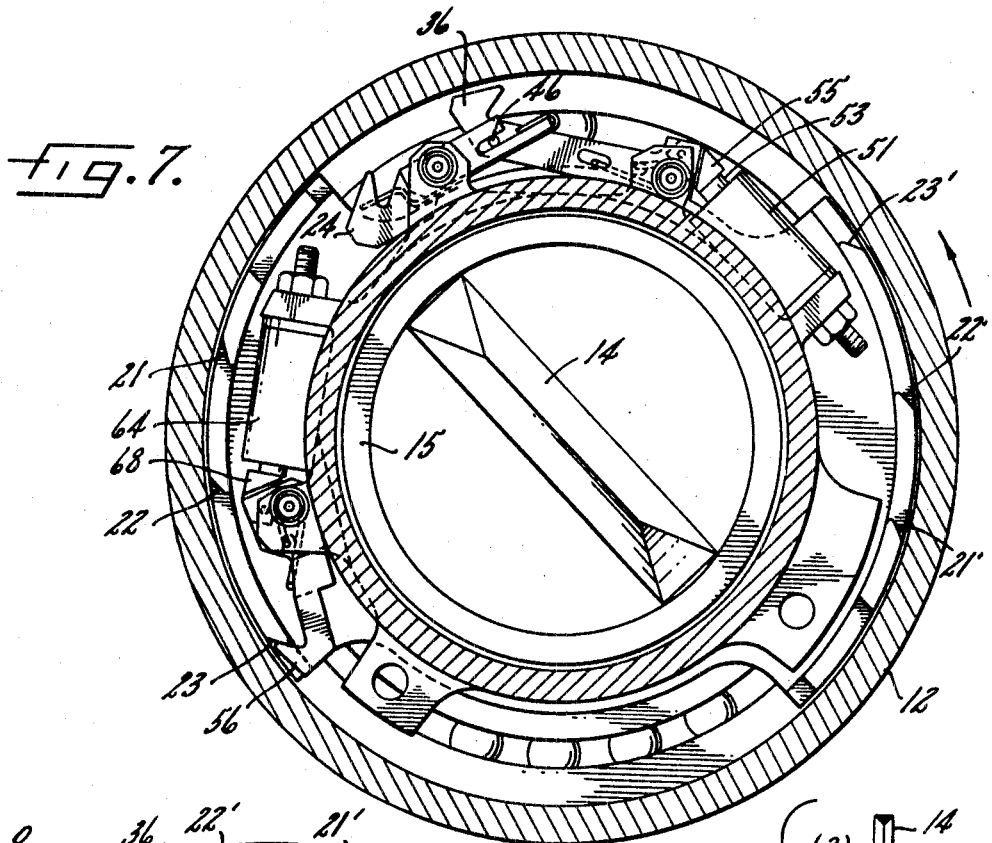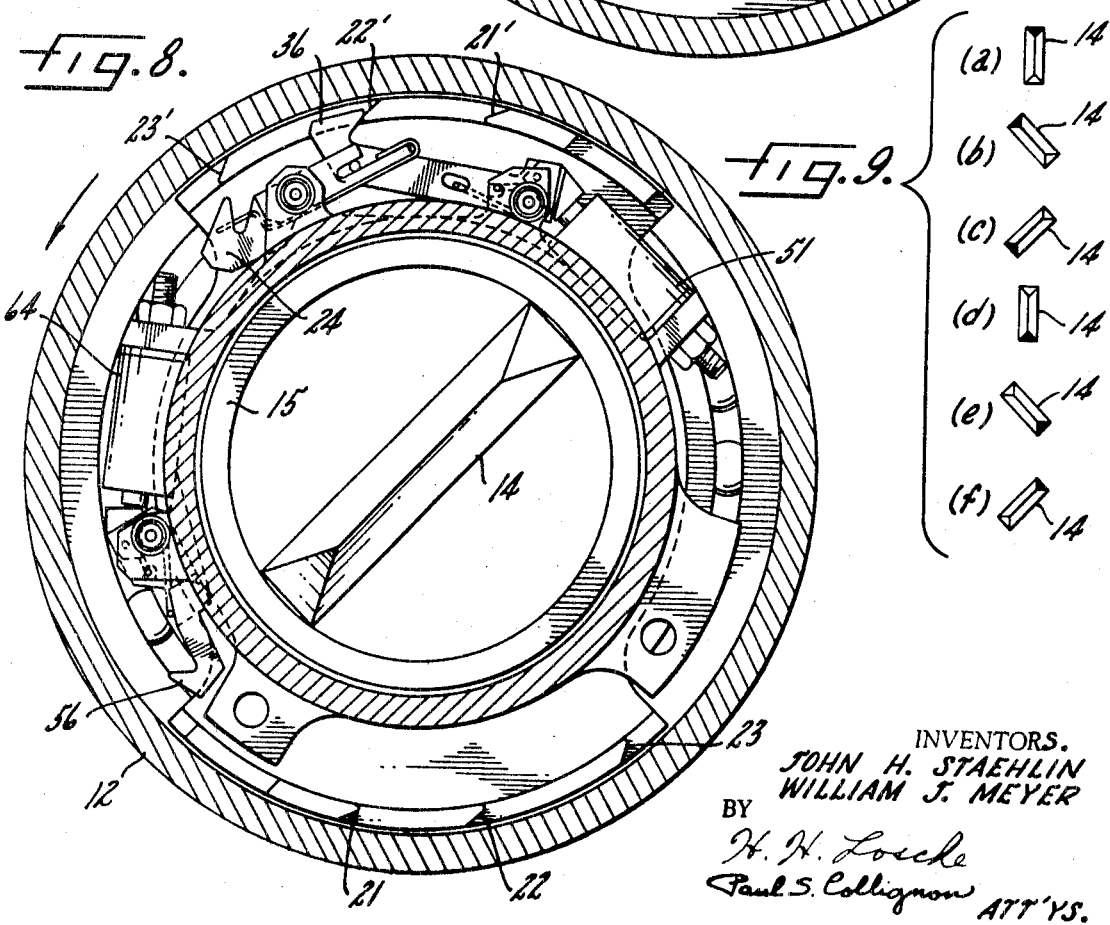

POLARIZATION DEVICE FOR RADAR ANTENNA

Many radar systems are designed to operate either in a linear polarization mode or a circular polarization mode. While the normal mode of operation is the linear mode, under some weather conditions, such as heavy rain, there is considerable advantage in using circular polarization. This results from the fact that raindrops, which are spherical, reflect circularly polarized waves back as circularly polarized waves that are polarized in the opposite sense, whereas most targets are nonspherical and reflect but a portion of the circularly polarized transmitted waves, the reflected portion being elliptically or linearly polarized.

In addition to having a selection of polarization modes for weather condition, a plurality of modes are also useful in combat operations, as the radar is less susceptible to jamming. It has been proven in actual flight tests that antijamming performance can be enhanced by being able to change to a left-hand circular polarization as well as the commonly used right-hand circular and vertical linear polarizations.

In one heretofore known device for selectively switching modes, a quarter-wave plate is rotatably mounted within a feedhorn that can be rotated in a clockwise or counterclockwise direction. With the feedhorn being rotated in a counterclockwise direction, friction between the outer race of a bearing mounting the quarter-wave plate and the inner race causes the quarter-wave plate to be rotated until its housing is stopped by a mechanical stop. In this position, which is referred to as the left-hand circular mode, the quarter-wave plate is positioned diagonally at approximately forty-five degrees to the vertical axis of the feedhorn. In order to change to a right-hand circular mode, it is merely necessary to change the direction of rotation of the feedhorn. With the feedhorn rotating in a clockwise direction, the quarter-wave plate will be rotated ninety degrees until its housing encounters a second mechanical stop. This position is referred to as the right-hand circular mode. In order to change from a left-hand circular mode to a linear polarization mode, an electromagnet is energized which, in turn, causes a third stop to be pivoted into position such that it will permit the quarter-wave plate to be rotated only forty-five degrees. The direction of rotation of the feedhorn is then changed to a clockwise direction and the quarter-wave plate is rotated in that direction until its housing is stopped by the third mechanical stop that was previously pivoted into position.

While the above-described method of changing polarization does work satisfactorily, there are several inherent disadvantages in this method of polarization selection. First, the time lag involved in reversing the feedhorn motor could cause the radar to lose its "locked on" status. Also, an error results in the positioning of the reference generator when the direction of the feedhorn is reversed since the generator is nulled for either clockwise or counter-clockwise rotation.

In the present invention, the antenna feedhorn is rotated continuously in one direction and each of three polarizations, that is, left-hand circular, right-hand circular, or linear, can be quickly selected by energizing certain electromagnets. A quarter-wave plate is mounted within a housing that is provided with three catch surfaces, with the housing being rotatably mounted with respect to a rotating feedhorn. Three separate levers, which are actuated by electromagnets, are pivotally mounted to a stationary ring within the feedhorn, and by selectively energizing the electromagnets various levers can be made to engage various catch surfaces. When no lever is engaged with any catch surface, the housing, and consequently the quarter-wave plate, is rotated due to the friction of the bearing that mounts the housing to the rotating feedhorn.

It is therefore a general object of the present invention to provide a radar system with an antenna that will increase the anti-jamming performance of the radar system.

Another object of the present invention is to provide an antenna that can provide a left-hand circular, a right-hand circular, or a linear mode of polarization.

Still another object of the present invention is to provide an antenna with a plurality of polarization modes that can be switched without reversing the direction of rotation of a rotating feedhorn.

A further object of the present invention is to provide an antenna with a plurality of polarization modes that can be switched from a remote position.

Other objects and advantages of the present invention will be readily appreciated as the same becomes better understood by reference to the following detailed description when considered in connection with the accompanying drawings wherein:

FIG. 1 is a side view showing a feedhorn of a radar antenna;

FIG. 2 is a sectional view taken on line 2—2 of FIG. 1 and showing a quarter-wave plate in a linear polarization mode;

FIG. 3 is a sectional view taken on line 3—3 of FIG. 2;

FIG. 4 is a sectional view taken on line 4—4 of FIG. 3;

FIG. 5 is a sectional view taken on line 5—5 of FIG. 4;

FIG. 6 is a sectional view taken on line 6—6 of FIG. 4;

FIG. 7 is a sectional view similar to FIG. 4 of the drawings only showing a quarter-wave plate in a left-hand circular polarization mode;

FIG. 8 is a sectional view similar to FIG. 4 of the drawings only showing a quarter-wave plate in a right-hand circular polarization mode; and FIG. 9(a) – 9(f) is a diagrammatic view showing various polarization positions of a quarter-wave plate.

Referring now to FIG. 1 of the drawings, there is shown a paraboloidal antenna 11 having a feedhorn 12 which is offset from the center axis of a reflector 13. Feedhorn 12 is rotated by a spin motor (not shown). The offset focal point causes r–f energy to be lobed in a pencil-shaped beam about the center axis of reflector 13.

Within the feedhorn 12, as shown in FIGS. 2 through 8 of the drawings, a quarter-wave plate 14 is positioned in a housing 15 which, in turn, is rotatably mounted in the inner race 16 of a bearing 17. By way of example, the quarter-wave plate 14 might be made of polystyrene. The outer race 18 of bearing 17 is in contact with the inside diameter of feedhorn 12 and rotates with feedhorn 12. Housing 15 is provided with three pair of catch surfaces, these being designated as 21 and 21', 22 and 22', and 23 and 23'. Each pair is in stepped relation with the other two pair, with pair 21—21' being on the outer end portion of housing 15. Pair 22—22' is adjacent pair 21—21', and pair 23—23' is adjacent pair 22—22'. Catch surface 21 is positioned 180° from catch surface 21' and likewise catch surfaces 22 and 23 are displaced 180° from catch surfaces 22' and 23', respectively.

Referring now to FIGS. 4 and 5 of the drawings, a latch 24, which is engageable with catch surfaces 21 and 21' is pivotally connected to a ring 25 that is stationarily mounted with feedhorn 12. A pair of bosses 26 and 27 are provided on ring 25 and latch 24 is pivotally mounted on shaft 28 that is rotatably supported in bearings 31 and 32 that are mounted in bosses 26 and 27, respectively. A detent spring 33 is attached to latch 24 and is engageable with holes 34 and 35 in housing 15. The function of detent spring 33 will be hereinafter described.

A second latch 36, which is engageable with catch surfaces 22 and 22', is also pivotally connected to ring 25 by means of shaft 37 that is rotatably mounted in bearings 38 and 39 that are mounted, respectively, in bosses 41 and 42. A spring 43, which has one end engaged with slot 44 in boss 42 and the other end engaged with slot 45 in latch 36, biases latch 36 downwardly so that latch 36 normally will not be in a position to engage catch surfaces 22 and 22'. A pin 46 is secured, as by press-fitting, to latch 36, and is slidably actuable in slots 47 and 48 that are provided in latch 24. The biasing action of spring 43, which biases latch 36 downwardly, in turn, acts through pin 46 to bias latch 24 in an upward direction so that latch 24 will engage, or be in a position to engage, either catch surface 21 or 21'. A pair of electromagnets 51 and 52 are mounted on ring 25 and have their armatures 53 and 54 engageable with bar 55 that is attached to latch 36. Upon energization of electromagnets 51 and 52, their armatures 53 and 54 will be retracted and, in turn, latch 36 will be pivoted upwardly so as to be in a position to engage either catch surface 22 or 22', and latch 24 will be pivoted downwardly so that it will be disengagable with catch surfaces 21 and 21'.

A third latch 56, which is engageable with catch surfaces 23 and 23', is also pivotally connected to ring 25 by means of shaft 57 that is rotatably mounted in bearings 58 and 59, which are mounted, respectively, in bosses 61 and 62. A spring 63 is provided to normally bias latch 56 away from catch surfaces 23 and 23'. A second pair of electromagnets 64 and 65 are mounted on ring 25 and have their armatures 66 and 67 engageable with bar 68 that is attached to latch 56. Upon energization of electromagnets 64 and 65, their armatures 66 and 67 will be retracted and, in turn, latch 56 will be pivoted upwardly so as to be in a position to engage either catch surface 23 or 23'.

In operation, assuming that the radar is operating in the linear polarization mode, both sets of electromagnets would be deenergized and latch 24 would be engaged either with catch surface 21 or catch surface 21'. (Assume, for purposes of illustration, that latch 24 is engaged with catch surface 21, as shown in FIG. 4 of the drawings, and as represented in FIG. 9(a).) With feedhorn 12 rotating, housing 15 has a tendency to rotate in the same direction as feedhorn 12, due to the friction between the balls and inner race 16 of bearing 17. However, latch 24, which is engaged with catch surface 21, will prevent rotation of housing 15. When feedhorn 12 is stationary, the frictional force of bearing 17 will not be present, however, detent spring 33 will be engaged with hole 34 and will prevent any relative movement between housing 15 and feedhorn 12 that could be caused by shock or vibrational forces.

Assuming now that it is desired to switch to a left-hand circular polarization mode, both pairs of electromagnets are energized. As best shown in FIGS. 5 and 7 of the drawings, the energization of electromagnets 51 and 52 will cause armatures 53 and 54 to retract which will cause latch 36 to be pivoted about shaft 37 so that latch 36 will be in a position to engage catch surface 22'. As the catch end of latch 36 moves upwardly, the movement of pin 46 in slots 47 and 48 will cause lever 24 to be pivoted about shaft 28 and thus latch 24 will become disengaged with catch surface 21. The energization of electromagnets 64 and 65 will, likewise, cause latch 56 to be pivoted into a position so that it can engage catch surface 23.

As soon as latch 24 becomes disengaged with catch surface 21, housing 15, and consequently quarter-wave plate 14, will be rotated in the same direction of rotation as feedhorn 12. Both latches 56 and 36 will be in a raised position to engage a catch surface, however, latch 56 will engage catch surface 23 after housing 15 is rotated forty-five degrees. Quarter-wave plate 14 will then be positioned at forty-five degrees, as shown in FIG. 7 of the drawings, which has been designated as the left-hand circular polarization mode.

In order to now switch from a left-hand circular polarization mode, as shown in FIG. 7 of the drawings, to a right-hand circular polarization mode, as shown in FIG. 8 of the drawings, electromagnets 64 and 65 are de-energized and spring 63 biases latch 56 downwardly so that it is no longer engaged with catch surface 23. Housing 15 is then rotated ninety degrees whereupon catch surface 22' is engaged by latch 36.

Referring now to FIG. 9 of the drawings, the following chart shows the relationship between the latches and catch surfaces to provide the desired polarization.

| FIG. | Polarization mode | Mech. engagement | | | Energization of electromagnets |
| --- | --- | --- | --- | --- | --- |
| 9(a) | linear | latch 24– | surface | 21 | None |
| 9(b) | left-hand circular | " 56– | " | 23 | Both sets |
| 9(c) | right-hand circular | " 36– | " | 22' | 51 and 52 |
| 9(d) | linear | " 24– | " | 21' | None |
| 9(e) | left-hand circular | " 56– | " | 23' | Both sets |
| 9(f) | right-hand circular | " 36– | " | 22 | 51 and 52 |

As indicated above, neither set of electromagnets is energized when the linear polarization mode is being utilized. As the linear polarization mode is the mode that will be used most frequently, less wear will be involved for the electromagnets. Also, by providing the catch surfaces in pairs, switching can be accomplished more rapidly.

It can thus be seen that the present invention permits rapid changing from one polarization to another without having to change the direction of rotation of the antenna feedhorn.

Obviously many modifications and variations of the present invention are possible in the light of the above teachings. It is therefore to be understood that within the scope of the appended claims, the invention may be practiced otherwise than as specifically described.

What is claimed is:

1. In a radar antenna system having a rotatable feedhorn, a polarization selector comprising:
   a tubular housing having a flange portion with a plurality of catch surfaces, said tubular housing being rotatably mounted within said feedhorn,
   a quarter-wave plate positioned within said tubular housing,
   a ring stationarily mounted relative to and within said feedhorn,
   first, second, and third latches pivotally mounted to said ring, and
   means for selectively pivotally actuating said latches.

2. In a radar antenna system having a rotatable feedhorn, a polarization selector as set forth in claim 1 wherein said second latch is slidably connected to said first latch whereby actuation of said second latch causes actuation of said first latch.

3. In a radar antenna system having a rotatable feedhorn, a polarization selector as set forth in claim 2 wherein said means for selectively pivotally actuating said latches comprises a first pair of electromagnets for actuating said second latch and a second pair of electromagnets for actuating said third latch.

4. In a radar antenna system having a rotatable feedhorn, a polarization selector as set forth in claim 2 wherein said housing is rotatably mounted in a bearing having inner and outer races, said outer race being secured to said rotatable feedhorn.

* * * * *